(12) United States Patent
Overhultz et al.

(10) Patent No.: US 7,021,535 B2
(45) Date of Patent: *Apr. 4, 2006

(54) ADVERTISING COMPLIANCE MONITORING SYSTEM

(75) Inventors: Gary L. Overhultz, River Forest, IL (US); Robert W. Mead, Chicago, IL (US)

(73) Assignee: Goliath Solutions, LLC, Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/975,110

(22) Filed: Oct. 27, 2004

(65) Prior Publication Data

US 2005/0095573 A1   May 5, 2005

Related U.S. Application Data

(63) Continuation of application No. 10/158,416, filed on May 30, 2002, now Pat. No. 6,837,427.

(60) Provisional application No. 60/332,149, filed on Nov. 21, 2001.

(51) Int. Cl.
*G06K 5/10* (2006.01)
(52) U.S. Cl. .............. 235/382; 235/383; 235/451; 235/384; 705/5; 705/20
(58) Field of Classification Search ............... 235/382, 235/383, 384, 375, 451; 705/5, 20, 23
See application file for complete search history.

(56) References Cited

U.S. PATENT DOCUMENTS

| | | | |
|---|---|---|---|
| 5,168,263 A * | 12/1992 | Drucker ............... 340/571 |
| 5,201,060 A | 4/1993 | Haruyama et al. |
| 5,235,326 A * | 8/1993 | Beigel et al. ........... 340/10.41 |
| 5,252,979 A | 10/1993 | Nysen |
| 5,448,226 A | 9/1995 | Failing, Jr. et al. |
| 5,583,819 A | 12/1996 | Roesner et al. |
| 5,583,850 A | 12/1996 | Snodgrass et al. |
| 5,640,683 A | 6/1997 | Evans et al. |
| 5,745,036 A | 4/1998 | Clare |
| 5,774,876 A | 6/1998 | Woolley et al. |
| 5,776,278 A | 7/1998 | Tuttle et al. |
| 5,894,266 A | 4/1999 | Wood, Jr. et al. |
| 5,910,776 A | 6/1999 | Black |
| 5,920,261 A | 7/1999 | Hughes et al. |
| 5,936,527 A | 8/1999 | Isaacman et al. |
| 5,949,335 A | 9/1999 | Maynard |

(Continued)

OTHER PUBLICATIONS

Article re: "Mobilocity Inc.", Issue No. 60, Aug. 9, 2001—M-Business Insights (15 pgs.).

(Continued)

*Primary Examiner*—Steven S. Paik
(74) *Attorney, Agent, or Firm*—Ronald A. Sandler; Jones Day

(57) ABSTRACT

An advertising compliance monitoring system is provided that includes a tag affixed to a sign or marketing material or shopper ID card, the tag communicating with a reader on a periodic basis. The tag includes a memory for storing tag data, a transmitter and a receiver. The tag uses sleep modes to conserve power. The tag transmits tag data to a reader in response to an interrogation request, or automatically on a periodic basis. The tag data includes an identification number used to identify the tag associated with a particular sign, price, marketing material or shopper, status data (e.g., delivered, displayed), and time and date information. This data is processed by a central server to determine compliance with and/or exposure to a particular advertising program.

26 Claims, 4 Drawing Sheets

U.S. PATENT DOCUMENTS

| | | | |
|---|---|---|---|
| 5,955,951 | A | 9/1999 | Wischerop et al. |
| 5,959,568 | A | 9/1999 | Woolley |
| 5,963,134 | A | 10/1999 | Bowers et al. |
| 5,964,656 | A | 10/1999 | Lawler, Jr. et al. |
| 5,974,368 | A | 10/1999 | Schepps et al. |
| 6,002,344 | A | 12/1999 | Bandy et al. |
| 6,005,482 | A | 12/1999 | Moran et al. |
| 6,013,949 | A | 1/2000 | Tuttle |
| 6,025,780 | A | 2/2000 | Bowers et al. |
| 6,037,879 | A | 3/2000 | Tuttle |
| 6,043,746 | A | 3/2000 | Sorrells |
| 6,045,652 | A | 4/2000 | Tuttle et al. |
| 6,061,614 | A | 5/2000 | Carrender et al. |
| 6,070,156 | A | 5/2000 | Hartsell, Jr. et al. |
| 6,078,888 | A * | 6/2000 | Johnson, Jr. .................. 705/1 |
| 6,084,530 | A | 7/2000 | Pidwerbetsky et al. |
| 6,091,319 | A | 7/2000 | Black et al. |
| 6,097,301 | A | 8/2000 | Tuttle |
| 6,100,790 | A | 8/2000 | Evans et al. |
| 6,104,279 | A | 8/2000 | Maletsky |
| 6,107,917 | A | 8/2000 | Carrender et al. |
| 6,109,568 | A | 8/2000 | Gilbert et al. |
| 6,121,878 | A | 9/2000 | Brady et al. |
| 6,121,880 | A | 9/2000 | Scott et al. |
| 6,127,917 | A | 10/2000 | Tuttle |
| 6,127,928 | A | 10/2000 | Issacman et al. |
| 6,133,836 | A | 10/2000 | Smith |
| 6,137,403 | A | 10/2000 | Desrochers et al. |
| 6,148,291 | A | 11/2000 | Radican |
| 6,150,921 | A | 11/2000 | Werb et al. |
| 6,150,934 | A | 11/2000 | Stiglic |
| 6,150,948 | A | 11/2000 | Watkins |
| 6,169,483 | B1 | 1/2001 | Ghaffari et al. |
| 6,177,861 | B1 | 1/2001 | MacLellan et al. |
| 6,195,005 | B1 | 2/2001 | Maloney |
| 6,195,006 | B1 | 2/2001 | Bowers et al. |
| 6,198,392 | B1 | 3/2001 | Hahn et al. |
| 6,204,764 | B1 | 3/2001 | Maloney |
| 6,212,401 | B1 | 4/2001 | Ackley |
| 6,215,403 | B1 | 4/2001 | Chan et al. |
| 6,220,516 | B1 | 4/2001 | Tuttle et al. |
| 6,229,445 | B1 | 5/2001 | Wack |
| 6,232,870 | B1 | 5/2001 | Garber et al. |
| 6,236,315 | B1 | 5/2001 | Helms et al. |
| 6,246,882 | B1 | 6/2001 | Lachance |
| 6,249,227 | B1 | 6/2001 | Brady et al. |
| 6,253,190 | B1 * | 6/2001 | Sutherland .................. 705/20 |
| 6,260,049 | B1 | 7/2001 | Fitzgerald et al. |
| 6,262,662 | B1 | 7/2001 | Back et al. |
| 6,265,962 | B1 | 7/2001 | Black et al. |
| 6,265,963 | B1 | 7/2001 | Wood, Jr. |
| 6,269,342 | B1 * | 7/2001 | Brick et al. .................. 705/20 |
| 6,272,457 | B1 | 8/2001 | Ford et al. |
| 6,298,591 | B1 | 10/2001 | Healy |
| 6,304,856 | B1 | 10/2001 | Soga et al. |
| 6,308,177 | B1 | 10/2001 | Israni et al. |
| 6,308,446 | B1 | 10/2001 | Healy |
| 6,312,106 | B1 | 11/2001 | Walker |
| 6,369,712 | B1 | 4/2002 | Letkomiller et al. |
| 6,405,102 | B1 | 6/2002 | Swartz et al. |
| 6,577,238 | B1 | 6/2003 | Whitesmith et al. |
| 6,580,358 | B1 | 6/2003 | Nysen |
| 6,650,230 | B1 | 11/2003 | Evans et al. |
| 6,837,427 | B1 * | 1/2005 | Overhultz et al. .......... 235/382 |
| 2001/0000430 | A1 | 4/2001 | Smith et al. |
| 2001/0001553 | A1 | 5/2001 | Hahn et al. |
| 2001/0004236 | A1 | 6/2001 | Letkomiller et al. |
| 2001/0054959 | A1 | 12/2001 | Horn et al. |
| 2002/0140546 | A1 | 10/2002 | Tuttle |
| 2002/0143668 | A1 | 10/2002 | Goodwin, III |
| 2002/0149468 | A1 | 10/2002 | Carrender et al. |
| 2002/0149480 | A1 | 10/2002 | Shanks et al. |
| 2002/0149481 | A1 | 10/2002 | Shanks et al. |
| 2002/0149482 | A1 | 10/2002 | Shanks et al. |
| 2002/0149483 | A1 | 10/2002 | Shanks et al. |

OTHER PUBLICATIONS

Article re: http://www.frontlinetoday.com, "What will they think of next?," Nov. 11, 2001 (4 pgs.).
Article re: http://www.frontlinetoday.com, "Find your stuff," Nov. 11, 2001 (4 pgs.).
Article re: http://www.frontlinetoday.com, "Getting organized on RFID," Nov. 11, 2001 (2 pgs.).
Article re: http://www.frontlinetoday.com, "Top 100 Companies: #10 Printronix," Nov. 11, 2001 (2 pgs.).
Article re: http://www.frontlinetoday.com, "Top 100 Companies: #9 PeopleSoft/Vantive," Nov. 11, 2001 (2 pgs.).
Article re: http://www.frontlinetoday.com, "Top 100 Companies: #8 Hand Held Products, a Welch Allyn Affiliate," Nov. 11, 2001 (2 pgs.).
Article re: http://www.frontlinetoday.com, "Top 100 Companies: #7 PSC," Nov. 11, 2001 (2 pgs.).
Article re: http://www.frontlinetoday.com, "Top 100 Companies: #6 Texas Instruments," Nov. 11, 2001 (2 pgs.).
Article re: http://www.frontlinetoday.com, "Top 100 Companies: #5 Lucent Technologies/Agere Systems," Nov. 11, 2001 (2 pgs.).
Article re: http://www.frontlinetoday.com, "Top 100 Companies: #4 Intermec," Nov. 11, 2001 (2 pgs.).
Article re: http://www.frontlinetoday.com, "Top 100 Companies: #2 Zebra Technologies," Nov. 11, 2001 (2 pgs.).
Article re: http://www.frontlinetoday.com, "Top 100 Companies: #1 Symbol Technolgies," Nov. 11, 2001 (2 pgs.).
Article re: http://www.emetro.ca/Computers/Software/Bar_Code/, Nov. 11, 2001 (6 pgs.).
Article re: http://www.webcrawler.com/business/supplies_and_services/bar_codes/general_suppliers/, Nov. 11, 2001 (4 pgs.).
Article re: http://www.iop.co.uk/pakex2001.htm, Nov. 11, 2001 (8 pgs.).
Article re: http://www.emetro.ca/Computers/Software/Bar_Code/, Nov. 11, 2001 (16 pgs.).
Article re: Frontline Solutions Website, May 2001 (4 pgs.).
Article re: Speeding Through Store Checkout Lines, May 16, 2001 (2 pgs.).
Article re: (BW) (NJ-Checkpoint-Systems)(CKP) Checkpoint Systems Brings RFID Technology to Access Control Market With new Line of Readers and Cards, Oct. 1, 2001 (2 pgs.).
Article re: Logistics: The No-Gap Procurement Process, Nov. 11, 2001 (pp. 44-45).
Press Release from Transponder News re: "Motorola announces BiStatix 125KHz RFID tag," Mar. 2, 1999 (2 pgs.).
Press Release from Transponder News re: "RFID and home delivery boxes could revolutionize home laundry," May 2, 2000 (2 pgs.).

* cited by examiner

ADVERTISING COMPLIANCE MONITORING SYSTEM

CROSS-REFERENCE TO RELATED APPLICATION

This is a continuation application of commonly-owned U.S. patent application Ser. No. 10/158,416, filed May 30, 2002, now U.S. Pat. No. 6,837,427 claiming the benefit of U.S. provisional application Ser. No. 60/332,149, filed on Nov. 21, 2001. The applicants are claiming priority to this provisional application, making the effective filing date of this application Nov. 21, 2001.

FIELD OF THE INVENTION

The present invention relates to a system and method of monitoring compliance with a Point of Purchase (POP) advertising program that displays one or more advertising signs or marketing materials, and more particularly to the monitoring of and exposure to advertising signs or marketing materials displayed at gas stations, convenience stores, grocery stores, mass merchandising outlets, drug stores, specialty retail outlets (e.g., pet stores, record stores, book stores), consumer electronics stores, etc.

BACKGROUND OF THE INVENTION

It is desirable to monitor retailer compliance with advertising programs. Advertising that is not displayed has no value to a company. However, non-compliance with an advertising program is difficult to detect in a timely manner.

In the past, the primary way to collect information about whether retail outlets were complying with an advertising program was to rely on site surveys. These surveys were typically performed by manufacturer sales representatives, store delivery personnel, or independent survey companies. However, site surveys are generally expensive, incomplete, and untimely.

The direct costs associated with site surveys are substantial. Independent survey companies charge significant fees for travel time, as well as for data collection/tabulation. Consequently, information is typically available for only a subset or sample of the thousands or tens-of-thousands of stores targeted for a particular advertising program.

To save money, some companies request that delivery personnel and/or sales representatives compile compliance information while they are at a retail store for other purposes. The diversion of these personnel from doing their ordinary tasks (such as restocking or selling) can be substantial. Moreover, these personnel have little compliance training or Quality Assurance skills to ensure reporting consistency or accuracy. In addition, such visits are not of sufficient frequency to ascertain exactly when compliance with a particular advertising program began or ended.

Furthermore, compliance survey reports (whether by professionals or company personnel) usually lag the survey date. This delay prevents a timely rectification for non-complying stores. In particular, if an advertising program is designed to run for two weeks, it is important to know within a day of when the program was supposed to start which retail sites are out of compliance so the sites can be made compliant in a timely manner. The size of the staff and expense required to visit all advertising sites within 48 hours is prohibitive. Therefore, surveys or visits to a subset of sites are the only practical way to monitor compliance. However, for the reasons stated above, surveys are only sufficient for general or strategic conclusions, and are incapable of improving tactical POP compliance in a timely manner. Visits to a subset of sites do not yield sufficient information for full-compliance advertising goals.

Companies, such as petroleum companies and consumer packaged goods companies, spend millions of dollars to run a given POP program. Retail performance varies greatly. However, it is common for more than 50% of retail sites, presumed to be participating, to be out of compliance. The present invention provides an efficient system for quickly identifying every non-complying site by using tags (e.g., wireless RFID tags) on each advertising sign or marketing material. The system also provides companies with information about when a POP program is running, what advertising is and is not being displayed, and when new signs will be produced and shipped to retail outlets. The system can monitor other merchandizing conditions besides signage, such as the presence or absence of display racks or containers, the presence of promotional hardware, or the presence of certain items to be sold under certain conditions. It can also monitor and report specific pricing associated with particular signs or marketing materials. The system can also monitor and report exposure of particular shoppers to marketing materials that are being monitored by the system. The system will therefore allow companies to monitor and remedy compliance problems during an advertising program, which will improve overall compliance and increase the effectiveness of the advertising program. It will also allow fee-based marketing programs that are conditional upon certain retail conditions being present at a particular time to be executed with more precision, reliability, and verifiability. Furthermore, it will allow the flow of specific shopper traffic within a store to be monitored and analyzed. In addition, the system will allow subsequent marketing programs, such as coupons or direct mail, to be tailored to or made conditional on shopper interests, shopping patterns, or prior exposure to marketing materials.

Therefore, it is desirable to provide an advertising or marketing material compliance monitoring system that provides compliance monitoring in a timely and cost effective manner.

It is also desirable to provide an advertising compliance monitoring system that makes determining compliance easy.

It is desirable to provide a wireless compliance monitoring system that uses active tags that conserve battery power.

It is also desirable to provide a wireless compliance monitoring system that uses passive tags to determine the specific location (within a narrow range) of selected marketing materials and/or version of selected marketing materials.

It is also desirable to provide a wireless compliance monitoring system that uses contact technology (such as EEPROM, optical, notch, or magnetic ink) to determine the specific location (within a very narrow range) and/or version of selected marketing materials.

It is desirable to provide a compliance monitoring system that uses passive tags that are small and light, making it easier to secure to advertising signs.

It is also desirable to transmit data from sign locations to a central collection point at individual retail sites using wireless technology for ease of installation at retail sites.

It is also desirable to provide a switch on the reader for switching a tag between different power conservation modes, such as OFF, sleep mode, or continuous monitoring mode.

It is desirable to transmit data from each retail site to a central storage/processing location to report individual and aggregate retailer execution of and consumer exposure to specific and aggregated marketing programs.

Thus, a need exists for an advertising compliance monitoring system that provides versatility and flexibility by providing a tag, associated with a specific sign, that communicates tag data to an external reader. The present invention provides a way to quickly and positively identify each tag, determine the status of each sign (e.g., delivered, displayed), monitor compliance with a marketing program, monitor customer exposure to a marketing program, and analyze tag data relating to the display of and exposure to advertising signs, marketing materials, pricing information, marketing program merchandise, and supporting hardware.

SUMMARY OF THE INVENTION

The present invention overcomes the disadvantages of the prior art by providing a system for monitoring compliance with an advertising program. In one embodiment, the system includes a tag, associated with a sign or shopper identification card, for communicating with a reader on a periodic basis. In one embodiment, the tag comprises an active tag, a passive tag or a contact tag. Active and passive tags each include a memory for storing tag data, a transmitter and a receiver. In the active tag embodiment, the tag uses sleep modes to conserve power. The tag transmits tag data to a reader in response to an interrogation signal, or automatically on a periodic basis. The tag data includes any or all of the following: an identification number used to identify the tag associated with a particular sign and/or marketing material, site location data (e.g., which retail site and/or location within a retail site where the marketing material should be displayed), and time and date information. This data is processed by a central server to determine compliance with a particular advertising program.

In one embodiment, the reader associated with a given location at the retail site communicates with one or more tags to detect their presence and obtain their tag data. A hub communicates with each reader and stores the tag data for all reader locations at a given retail site. The hub communicates with a central server to convey information such as displayed signage, featured price, marketing materials, and/or shopper exposure to marketing materials at that site. A central server stores and analyzes tag data from all sites to determine whether each retail outlet is in compliance with a specific advertising program (e.g., to determine if each sign is being displayed at the time and location specified by the program). The central server can also report which shopper identification cards have been proximate to a given reader.

BRIEF DESCRIPTION OF THE DRAWINGS

These and other features of the present invention will be more fully disclosed when taken in conjunction with the following Detailed Description of the Invention in which like numerals represent like elements and in which.

DETAILED DESCRIPTION OF THE INVENTION

The claimed system determines whether a particular sign is actually being displayed, so that the advertising benefit of the sign can be realized in a cost-effective manner. As used herein, "sign" is defined as including marketing materials, displays, pricing information, coupon dispensers, signage, display racks, floor or counter mats, containers, promotional hardware, shopper identification cards, and/or items to be sold under certain conditions (e.g., seasonal promotions, products, or displays).

Figure 1:
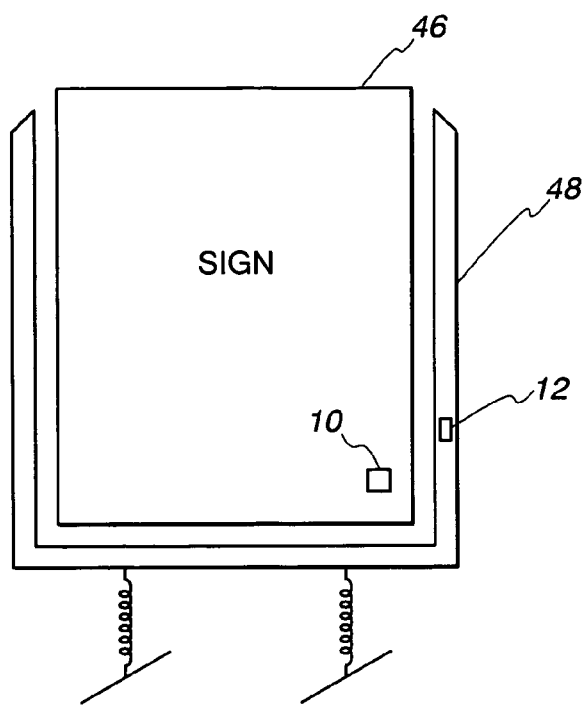
FIG. 1 shows one embodiment of an advertising compliance monitoring system including a sign having a tag affixed thereto, and sign hardware supporting the sign and having a reader affixed thereto.

Referring to FIG. 1, the system includes a tag 10 associated with a particular sign 46, and a tag reader 12 for determining whether the sign 46 is actually being displayed. The reader 12 is generally mounted on sign hardware 48. There are several types of tags 10. Active RFID tags 50 allow one reader 12 to determine whether all the signs in a certain defined area (e.g., on the property of a retail outlet) are being displayed; passive RFID tags 100 require a reader 12 for each sign/tag combination; and contact tags 1000 transmit stored data in response to an interrogation signal from a reader 12 that directly contacts the tag 1000.

Some advertising programs require the placement of advertising material within a general area (e.g., a display need only be placed in a department or aisle of a store). Active RFID tags, which contain a battery to permit their data contents to be transmitted over larger distances (e.g., several meters) can be used to monitor compliance with such advertising programs.

Some advertising programs require the placement of advertising material within a certain radius (e.g., a few inches) of a specific location (e.g., signs affixed to product displays or advertisements on a checkout counter near a cash register). Passive RFID tags can be used to monitor compliance with such advertising programs.

Figure 2:
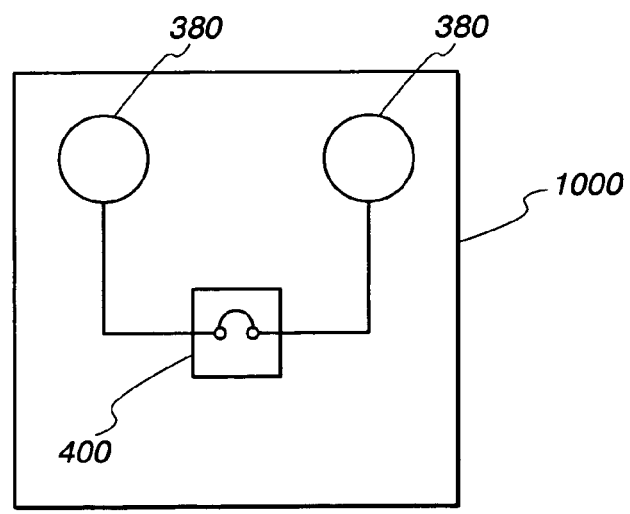
FIG. 2 represents a serial EEPROM contact tag according to one embodiment of the present invention.

Some advertising programs require the placement of advertising material in very precise location (e.g., a particular sign must be placed in a certain holder 48). Contact tags can be used to monitor compliance with such advertising programs. In one embodiment, contact tags comprise Serial Electronically Erasable Programmable Read Only Memory (Serial EEPROM) chips that store tag data. There are several types of Serial EEPROM chips, but most chips include two or three contacts (i.e., a 2-wire or 3-wire interface). Usually, the 3-wire devices have three data transfer wires and an addition wire. The 3-wire interfaces include Serial Peripheral Interface (SPI) and Microwire, which is a trademark of National Semiconductor. The 2-wire devices, called $I^2C$ or IIC, have only two wires. I²C is a trademark of Philips. FIG. 2 illustrates one embodiment of a 2-wire serial EEPROM chip (contact tag) 1000. The contact tag 1000 includes two contacts 380 and an EEPROM chip 400. In alternative embodiments, the number of contacts 380 may be decreased to one, or increased to three or more.

Figure 4:
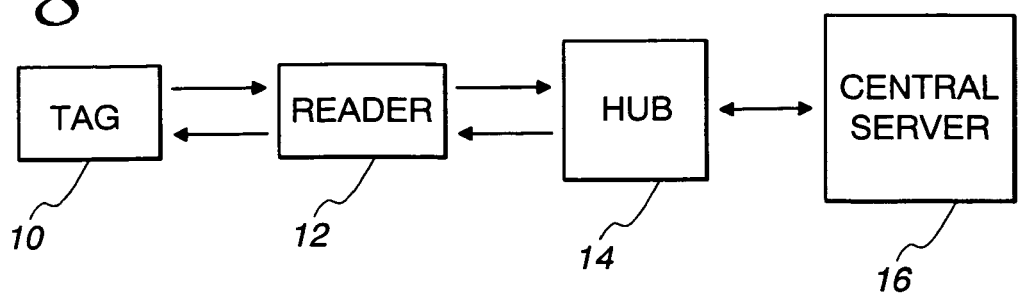
FIG. 4 shows one embodiment of an advertising compliance monitoring system including a tag, a reader, a hub, and a central server.

Referring to FIG. 4, the tag 10 stores identification data, status data, and time and date information. By reading this data, the reader 12 can convey the data to a hub 14, which can determine when a sign or marketing material is first displayed, and how long it is displayed. A hub 14 can send the data to a central server 16 that allows advertisers to verify whether their advertisements or promotional materials are actually being displayed.

In one embodiment, the tag 10 is activated manually by a portable reader, either before shipment of the marketing material or at the retail outlet. In another embodiment, the tag 10 is activated at the factory, before the marketing material is shipped.

Figure 3:
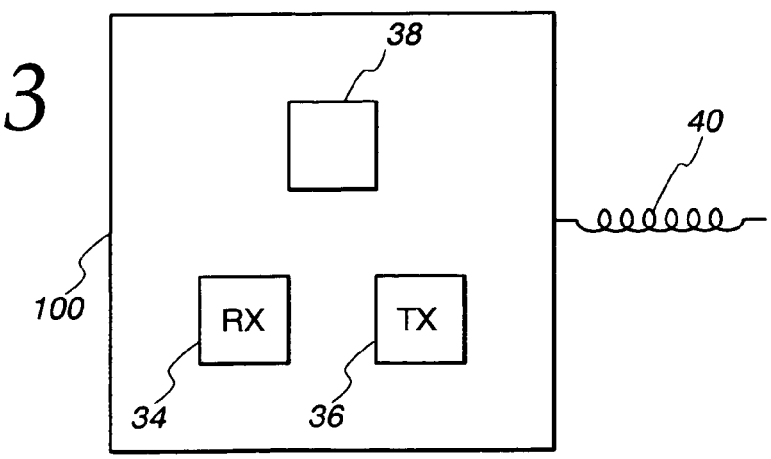
FIG. 3 represents a passive RFID tag, including a coil antenna, according to one embodiment of the present invention.

In one embodiment, the tag is a passive tag 100, as shown in FIG. 3. Passive tags rely on inductive (magnetic) coupling or capacitive coupling. To communicate with a passive tag 100, the reader must be in close proximity to the tag to allow communication between the tag and the reader. A passive tag is not self-powered, it has no battery. Communication is achieved, for example, by inductively coupling the reader and the tag. This allows the reader to provide the tag with a signal that includes the power necessary for the tag to respond to the reader and transmit its tag data. Passive tags 100 are generally smaller than active tags 10. Passive tags are generally read by a reader 12 that is mounted on the sign hardware 48, see FIG. 1. The reader 12 can detect the presence of a sign 46 that includes a passive tag when the sign is inserted into the sign hardware 48 or is proximal to a reader 12 that has been installed at the intended display location. As shown in the embodiment of FIG. 3, the passive tag 100 includes a receiver 34, a transmitter 36, a memory 38, and a coil antenna 40.

Active tags allow one reader 12 positioned at a central location to read one or more tags associated with one or more signs or marketing materials displayed at the retail outlet. In order to conserve power in active tags, these tags use a "sleeping" routine wherein the tag only periodically "wakes-up" to a search mode to look for interrogation signals from a reader. Upon detection of a transmission that is likely an interrogation signal, the tag fully awakens to an interrogation mode, verifies that the interrogation signal is valid, and responds to the valid interrogation signal by, for example, transmitting tag data to the reader 12. The tag also may be programmed to wake-up periodically and transmit its data on an autonomous basis, without being interrogated by a reader 12.

The present invention provides a means of determining compliance with an advertising program by affixing RFID tags on signs or marketing materials to be displayed at various locations at a retail outlet. The system can be used with an existing customer service call center to increase retailer compliance with Point of Purchase (POP) advertising programs. The system also provides an efficient and accurate way to perform compliance analysis, which assesses the degree to which retailers comply with each POP advertising program and the marketing value associated with a given advertising program.

Referring again to FIG. 4, the present system includes four main components: a tag 10, a transceiver (reader) 12, a hub 14, and a central server 16. A small tag 10 is affixed to a sign 46, either at the time of production or before delivery to a retail outlet. As used herein, affixed is defined as: mounted, integrally formed, adhered, fastened, etc. The tags will enable each sign to be encoded with information about when and where the signs or marketing materials should be displayed according to a given POP program. The reader 12 will periodically read data from the tags within range of the reader. Alternatively, the reader could manually read the tags at the command of a user (e.g., compliance inspector). In one embodiment, the readers 12 communicate with a hub 14 that would generally be located at the retail outlet. The hub 14 is connected to the central server 16 via a communications link (e.g., a telephone line). The central server 16 will receive the details of each POP program, including participating sites and desired display locations at each site. The central server 16 will also upload data from each hub for compliance analysis.

When signs or marketing materials arrive at their destination, the tags 10 associated with each sign can be read and registered as "delivered" by a transceiver, such as reader 12. The transceiver can read the presence of the signs or marketing materials even before they are unpacked. The signs or marketing materials will remain in storage until the beginning of the marketing program. In one embodiment, the hub 14 includes a display for announcing the beginning of a program, and instructing the retail outlet to install the signs or marketing materials in their respective locations. The hub 14 also receives and interprets tag data and provides command signals to the reader 12.

The reader 12 can be located on the sign or marketing material hardware 48 (e.g., frame) into which the sign or marketing material is placed. The reader will detect the presence of the tag 10 and register that the sign or marketing material 46 is "displayed". In one embodiment, each tag 10 has a transmission range of about seven feet. Thus, several signs or marketing materials can be tracked at a given retail site by one reader. Signs or marketing materials may be displayed close together, for example, at a gas station crind strip, on a pump topper, and adjacent several pump hose "squawkers" (small signs attached to a gas pump hose). Because each sign 46 is uniquely tagged, a single reader 12 centrally located on the pump can register and report the status of all signage or promotion materials associated with that pump. Moreover, seven feet of separation is generally sufficient to distinguish signs or marketing materials associated with one pump from the signs or marketing materials of an adjacent pump.

Given a short RFID transmission range, only those signs or marketing materials unpacked and placed into display hardware 48 will be registered as "displayed". Repeated polling (taking several reads every 24 hours) will establish continued compliance with a given POP program. When a single reader detects the presence of several signs or marketing materials that are intended for different locations (or no signs at all), the central server 16 will determine that the signs have either not yet been received, have not been unpacked, or are being stored in a central location and not being displayed. This information will allow a customer service representative (CSR) to call the retail outlet and investigate the non-compliance in a timely manner.

In one embodiment, each reader 12 includes a small RF transmitter 26 having a transmission range of 1,000 feet. Each reader will store the tag data from all the tags located within range of the reader. Each reader will also indicate the absence of any tags. The hub 14 will periodically poll the reader to upload the tag data. The reader will communicate with the hub 14 by selecting an interference-free RF channel from among several frequencies.

The readers can be permanently attached to and shipped with display hardware 48, or made available for permanent installation on an after-market basis. A percentage of signs or marketing materials, such as freezer static cling advertisements, do not require display hardware. For these signs, a reader 12 having an adhesive backing can be positioned within a short distance (e.g., seven feet) of the tag 10. In one embodiment, the readers 12 will be battery operated, which avoids the need for expensive or intrusive wiring.

In addition to triggering and collecting polling information every few hours, the hub 14 will serve as a storage device for current and prior readings for each display location at a given retail site. In one embodiment, at a prescribed time (e.g., 2 A.M.), the hub 14 will test the local telephone line for availability, and place a toll-free call to the central server 16. Once a connection is established, the server will receive the tag data, reset the hub registers, and send any updated program information to the hub.

The central server 16 will aggregate the tag data for all retail sites, and report all locations not complying with a prescribed POP program for the current 24-hour period. Details about specific sites out of compliance, including contact name and telephone number, will be available to a call center. Customer service representatives will use all available information about the non-complying site to ascertain what is preventing POP execution in a timely manner, and attempt to remedy the non-compliance. Several different POP programs can be monitored and reported at any particular time.

In one embodiment, data from the system can be integrated with Point Of Sale (POS) scanner data to assess the impact (or commercial success) of a given program, and how such success relates to advertising compliance. The system can also be used to compare the effectiveness of one POP program versus another program, or a predetermined target or standard.

Typically, a dozen or more POP programs are executed at each retail site over the course of a year. Improving advertising compliance could greatly increase product/service revenues.

In addition, companies that sponsor POP programs often offer payments to retailers for their participation in such programs, with such payment conditional upon display of certain marketing materials. Improving knowledge of specific participation levels and dates could greatly improve the effectiveness and efficiency of POP programs.

The present invention can be used at retail outlets including: gas stations, convenience stores, grocery stores, mass merchandising outlets, drug stores, specialty retail outlets (e.g., pet stores, record stores, book stores), consumer electronics stores, etc.

A tag, such as an RFID tag or contact tag, could also be used by the sign and marketing material manufacturers to improve shipping operations (by, for example, tracking shipments, or verifying the contents of a carton of marketing material prior to shipment).

Figure 5:
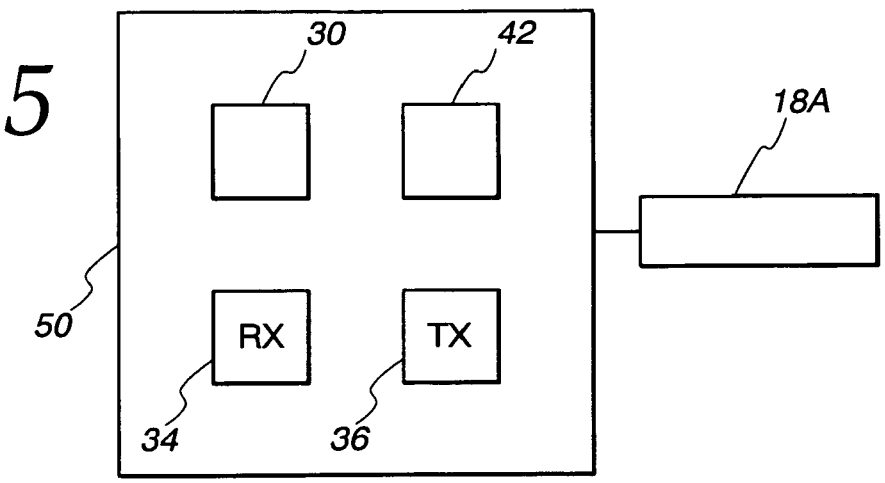
FIG. 5 represents an active RFID tag, including a monopole antenna, according to one embodiment of the present invention.

Illustrated in FIG. 4 is a block diagram of one embodiment of the advertising compliance monitoring system which includes a tag 10, a reader 12, a hub 14, and a central server 16. In one embodiment, the tag is an active RFID tag 50 (the tag is self-powered by a battery). In another embodiment, the tag is a passive RFID tag 100 (the tag is not self-powered, but receives energy electromagnetically from an external signal supplied by a reader). In the active tag embodiment, the active tag 50 includes a microprocessor (having a memory) 30, a receiver 34, a transmitter 36, a battery 42, and an antenna 18, as shown in FIG. 5. Signals are transmitted from and received by the tag 50 through the antenna 18. As used herein, microprocessor is defined as any processor, microcontroller, or custom IC, such as a FPGA, ASIC, etc.

To conserve battery power in active tags 50, these tags use a "sleeping" routine wherein the tag only periodically "wakes-up" to a search mode to look for interrogation signals from a reader. Upon detection of a transmission that is likely an interrogation signal, the tag fully awakens to an interrogation mode, verifies that the interrogation signal is valid, and responds to the valid interrogation signal by, for example, transmitting tag data to the reader. The tag also may be programmed to wake-up periodically and transmit its data on an autonomous basis, without being interrogated by a reader.

The tag 10 may be affixed either to a sign or to marketing material associated with a given marketing program. In one embodiment, the tag 10 is affixed to an advertising sign or marketing materials to be displayed, either when the sign or marketing material is produced or before delivery of the sign or marketing material to a retail outlet. The tags include an internal clock and a memory. The tags store: tag data, including an identification number, when the tag is delivered and displayed, and advertising information regarding when and where the sign or marketing material associated with the tag should be displayed according to a given advertising program.

The reader 12 will periodically read the tag data from the tag(s) within range of the reader 12. Alternatively, the reader 12 could manually read tag data from the tag(s) at the command of a user (e.g., compliance inspector). Once the tag data is received by the reader 12, it will be stored in memory. The reader 12 communicates with the hub 14 via a communication link 20. The hub is physically displaced from the reader 12, and is generally located in the retail outlet. The hub communicates with the central server via a communication link (e.g., a telephone line). The central server 16 is physically displaced from the hub 14, and is generally located hundreds or thousands of miles away from the hub. The central server 16 receives the details of each advertising program, including a list of participating sites and desired display locations at each site. The central server 16 will periodically upload tag data from each hub and perform compliance analysis for each advertising or POP program.

The reader 12 is designed to operate interactively with the tag 10. The reader 12 may be a hand-held unit or a fixedly mounted unit. Typically, the reader 12 is affixed to signage hardware 48. The reader 12 will periodically transmit a command signal for interrogating any tags within range of the reader. When a sign 46 is displayed in the signage hardware 48, the reader 12 will detect the tag 10 associated with the sign after the next command signal transmission. In response to the command signal, the tag 10 will transmit its tag identification number, any status data (e.g., delivered, displayed), and the time and date corresponding to the status. For example, if the sign was "displayed" at 6:30 p.m., on Jan. 25, 2002, the tag will transmit: status—displayed, time—6:30 p.m., date—Jan. 25, 2002. This tag data will be stored by the reader 12. Alternatively, the tag 10 need not store status data. The hub 14 can determine when a given reader 12 first reported the presence of the tag 10. Alternately, the hub 14 need not store the status data. The central server 16 can determine when a given reader 12 first reported the presence of a tag 10.

Figure 10:
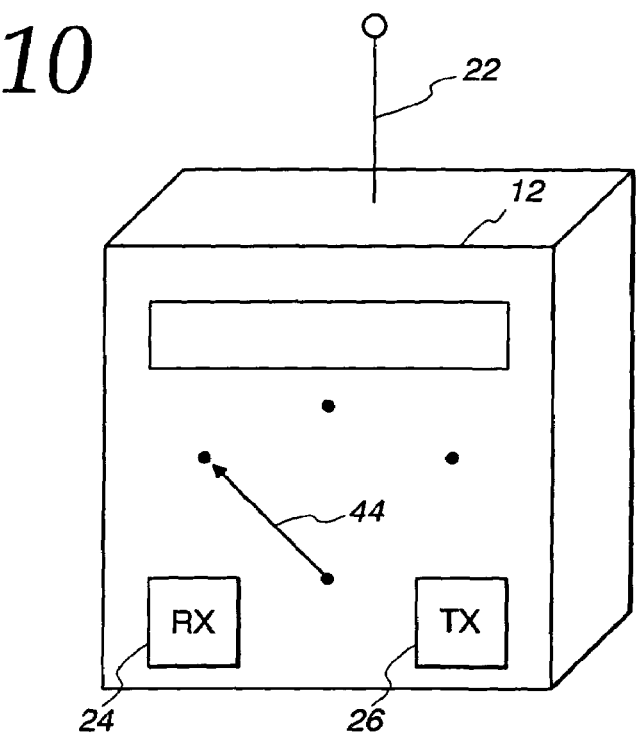
FIG. 10 shows a hand-held or permanent (fixed) reader including a switch for switching the tag between different power conservation modes.

FIG. 10 illustrates one embodiment of a hand-held or permanent (fixed) reader 12 that includes a switch 44 for switching the tag 10 between different power conservation modes, such as OFF (e.g., no monitoring), sleep mode (e.g., POP compliance monitoring), or continuous monitoring mode (e.g., consumer exposure monitoring). The reader 12 further includes an antenna 22, a receiver 24, and a transmitter 26. The antenna 22 is configured to receive signals from and transmit signals to the tag antenna 18. The reader 12 interacts with each tag 10 via a communication channel. Likewise, the reader 12 interacts with the hub 14 and/or the central server 16 via another communication channel. The communication channels may include an Ethernet link, Internet link, wire link, wireless link, microwave link, satellite link, optical link, cable link, RF link, LAN link, or other communication link.

The tag data obtained from individual tags 10 may be uploaded through the reader 12 to the hub 14 to the central server 16, which may include a database of all tag data. This data is then analyzed to determine which retail outlets are out of compliance with specific advertising programs.

In one embodiment, the tag antenna 18 is a monopole antenna 18A, as shown in FIG. 5. The monopole antenna 18A is a tunable antenna that achieves the same RF signal capability as a dipole configuration, but is smaller in size. Thus, the monopole antenna 18A enables the manufacture of a smaller tag having less mass. In one embodiment, the antenna 18A is made of standard bus wire.

Figure 6:
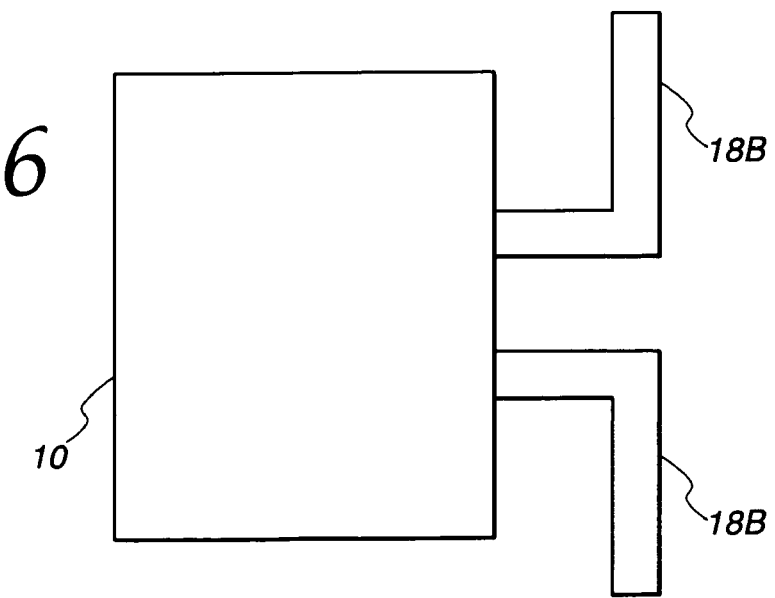
FIG. 6 represents an RFID tag, including a dipole antenna, according to one embodiment of the present invention.

FIG. 6 illustrates the tag antenna 18 as a dipole antenna 18B, having arms extending in a dipole fashion and connected to the electronics of the tag 10. In one embodiment, the antenna 18, along with the tag electronics, are encapsulated in an epoxy, such as Stycast®, and then affixed to the sign 46, as shown in FIG. 1.

Figure 7:
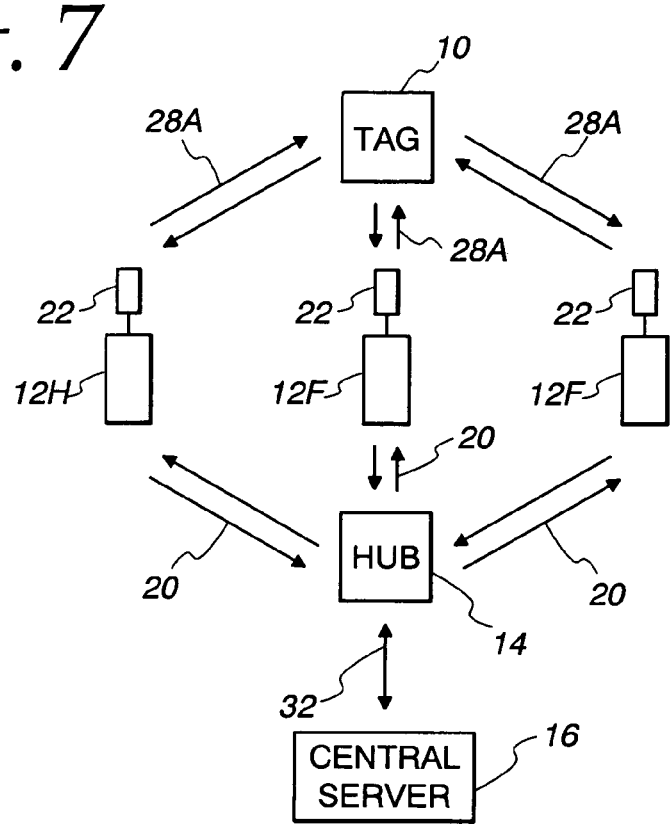
FIG. 7 shows one embodiment of an advertising compliance monitoring system including a tag, a reader and antenna, a hub, and a central server.

FIG. 7 illustrates one embodiment of the advertising compliance monitoring system, including a portable or hand-held reader 12H that is used for, inter alia, initially programming a tag 10 after a sign is made, before it is shipped, or after it is received by a retail outlet. In one embodiment, the tag 10 can also be reprogrammed so that tags on signs to be discarded can be remounted on different signs that are going to be deployed. Hand-held readers 12H are generally battery powered and include a keypad/keyboard, touch screen, or other input device known in the art, an LCD display for user interaction and data display, and sufficient memory to retain tag data from multiple tags before that data is uploaded to the hub 14.

Also shown in FIG. 7 are a multitude of fixed readers 12F, each having an associated antenna 22. The hub 14 is a separate component that is in communication with readers 12H, 12F through a communication channel 20. The hub 14 communicates to the central server 16 via a communication channel 32. As used herein, the term "communication channel" includes communication via an Ethernet link, Internet link, wire link, wireless link, microwave link, satellite link, optical link, cable link, RF link, LAN link, RS-232 serial link, telephone lines, or other communication link.

As shown in FIG. 7, data from the hub 14 is transferred to the central server 16. In one embodiment, the information from the hub 14 is transmitted across a communication channel 32, such as the Internet, to the central server 16. The central server 16 may be a personal computer, web server, or other computer with appropriate software to run and maintain a database of tag data. The central server may be accessed from a remote computer via, for example, the Internet. The reader 12, the hub 14, and the central server 16 may be, for example, two or more separate units, one computer partitioned into different virtual machines, or one virtual machine, acting as two of the components, that is connected to a second computer or processor acting as the third component.

Some advertisements contain a featured price that may change independently of the sign or display with which it is associated. In such cases, the tag 10 can be used to report such featured pricing information, in addition to sign and/or display information (such as "delivered", "displayed", etc.). In one embodiment, contact tags 1000 are used to monitor the value of each digit in a featured price (e.g., $32.89 would be read by using 4 or more plastic loose-leaf or spiral bound digits, each having a contact tag 1000 associated therewith). A single reader 12 is used to monitor all the digits and report the entire price as a single data field. Other components of a featured price that could be monitored include qualifying information about the conditions of the price (e.g., "per pack", "per carton", "2 liter bottle", "limit one per customer", or "buy one, get one free") and/or the brand being featured, such as "Winston", "Salem", "Coke", or "Bud Light".

Figure 8:
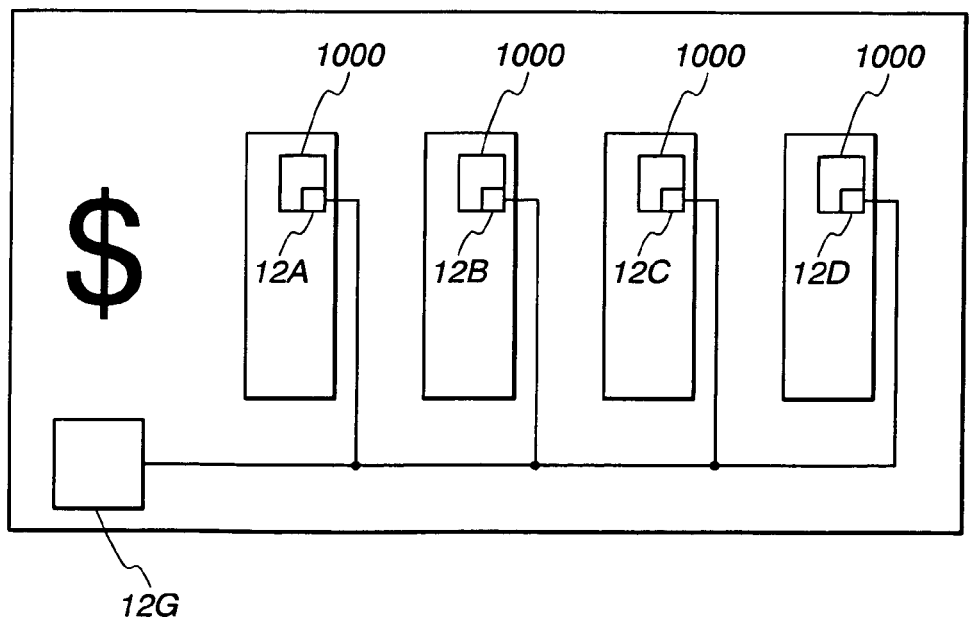
FIG. 8 shows a price reporting embodiment of the invention.

One embodiment of the invention used for price reporting is shown in FIG. 8. In this embodiment, each digit of the price includes a contact tag 1000. Individual readers 12A–12D are disposed on the digit holders such that each tag 1000 (disposed on a respective digit) makes contact with one of the respective readers 12A–12D. In this way, each digit of the price is monitored by one of the individual readers 12A–12D. In one embodiment, the individual readers 12A–12D each include a battery and a data management module, in addition to the contact reading and storage circuitry. The output of the individual readers 12A–12D is fed to a single group reader 12G, which communicates with the hub 14 and/or the central server 16. The data management module takes a data stream from the tag, converts that data stream into a standard data stream, such as an RS-232 data stream, and communicates the tag data to the reader 12, which relays the data to the hub 14 and/or the central server 16. The contact reading and storage circuitry allows each reader 12A–12D to read data from a respective contact tag 1000 and store that data.

In one embodiment, each reader 12 has the same back-end (i.e., transmitter and receiver components for communicating a specific data stream to the hub and/or central server) and several interchangeable front-ends (i.e., different data management modules for receiving data streams from different types of tags, such as passive, active and contact tags). The data streams from different types of tags may be different. Therefore, the interchangeable front-ends allow a reader 12 to communicate which different types of tags. The specific data stream sent to the hub and/or central server may be a standard data stream, such as an RS-232 data stream.

A contact tag reader includes a small set of contacts for stimulating a contact tag and receiving its data. In one embodiment, the contact tag reader is battery operated, and uses sleep modes to conserve power, as discussed below.

In another embodiment, the contact tags are implemented using optical, notch, or magnetic ink technologies. Magnetic ink technology can be used to monitor pricing information. In one embodiment, magnetic ink similar to that used to process checks is placed on pricing elements (e.g., plastic loose-leaf or spiral bound digits for displaying a featured price) and read by a contact reader that can distinguish patterns of magnetic field intensity.

In one embodiment, infrared or laser scanners are used to read pricing information. Such a scanner can detect patterns of light and dark printing on pricing elements based on the variation in light reflected back to the scanner. In another embodiment, a bar code scanner is used to read pricing information.

In a further embodiment, notch technology is used to read pricing information. For example, each pricing element (e.g., a plastic or cardboard card) may include a series of positional depressions (or the absence of them) along the perimeter of the pricing element or inconspicuous holes. In one embodiment, the presence or absence of a notch or hole in a given position is converted to a data stream via a series of two-position contacts on the price holder. When a hole or notch is encountered, the two opposing contacts physically touch each other, which creates a closed circuit. This closed circuit is detectable by a contact reader connected to the two contacts.

In one embodiment of the compliance monitoring system, the tags 10 store sign information (e.g., display status, identification data, time and date information, etc.). In another embodiment, the tags 10 store only a tag identifier, which may comprise a 32-bit unique identification number. This identifier is associated with extensive descriptive information stored on the central server 16. This descriptive information corresponds to the specific advertising material associated with the tag 10. In one embodiment, the tag identifier and the descriptive information are synchronized when the tag 10 is assigned and affixed to a particular sign 46. If a tag 10 is re-used (i.e., associated with a different sign) its unique tag identifier is reassigned to the descriptive information on the central server 16 corresponding to the new sign associated with the tag 10.

Some retailers may expect payment for placing hubs, readers, and tags within their stores for purposes of monitoring their compliance with advertising programs. Therefore, in one embodiment, the readers 12 are used for consumer exposure monitoring. In this embodiment, the system may be used in conjunction with a retailer's frequent shopper or loyalty program to inform the retailers and manufacturers about the advertisements having the most appeal to shoppers (e.g., which advertisements shoppers closely investigated for a predetermined amount of time). In this embodiment, frequent or loyal shoppers are issued shopper identification cards having unique RFID tags for storing information about the shoppers. As a shopper proceeds through a store, if the shopper closely investigates a particular advertisement having an RFID tag, the shopper could flash his/her RFID card in the vicinity of the sign (i.e., move the card near the sign) to trigger data transfer to the reader. In another embodiment, the card's proximity to the sign could trigger data transfer to the reader (e.g., the card could be read in a shopper's purse). Information about which signs and the number of signs flashed by each customer (or the number of signs the shopper investigated such that card data was transferred to one or more readers) is reported to the retailer and/or to manufacturers. This consumer exposure information is used to help improve the value of a retailer's frequent shopper program, and/or is integrated with purchase information to provide additional and/or personalized incentives to the frequent shoppers. In another embodiment, information about which advertisements interested consumers during shopping could be used to focus subsequent advertising material, such as direct mail. These embodiments would enable more effective and more relevant marketing programs for both manufacturers and retailers.

Figure 9:
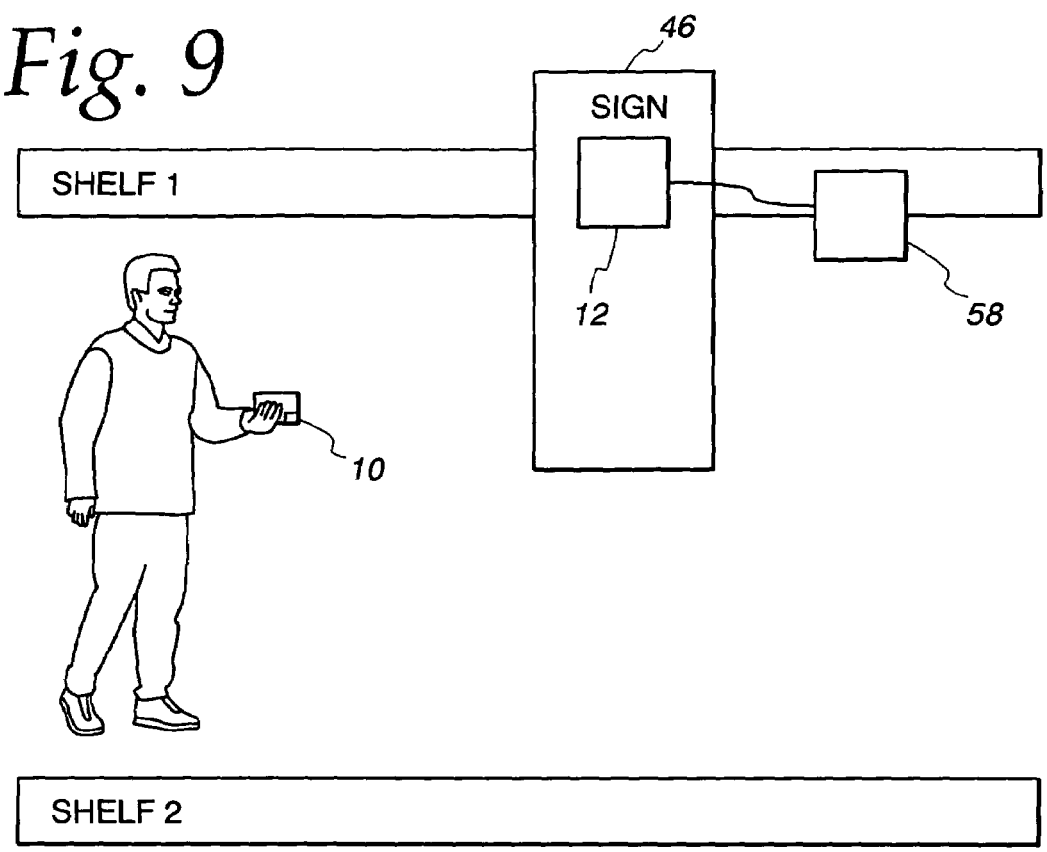
FIG. 9 shows a consumer exposure monitoring embodiment of the invention, the system including an advertising sign, a reader, a customer card with an embedded tag and a display device.

FIG. 9 illustrates use of the invention to monitor customer exposure to a particular advertising promotion in a store having two shelves. The customer is shown carrying a shopper identification card having a tag 10 (e.g., an active or passive tag) embedded in it. A reader 12 is associated with a sign 46 and reads the presence of the tag 10 when the customer card is adjacent the sign 46. The shopper may flash his/her card in the vicinity of the sign, and/or the reader may acquire the tag 10 when the card is within range of the reader 12. When the consumer card has been read, a confirming light or message is displayed by a display device 58 disposed on or adjacent the sign 46.

In FIG. 1, a sign 46 having a tag 10 affixed thereto is illustrated. The sign 46 is supported by sign or marketing material hardware 48, which has a reader 12 affixed thereto. In one embodiment, the reader 12 communicates with the tags 10 over a wireless RF link (e.g., 28A) operating at a frequency of about 13.56 MHz (which is an example of a frequency used to read passive RFID tags). The reader 12 and the tags 10 can communicate over any wireless link (e.g., 28A) and use any suitable frequency band. The Industrial, Scientific, and Medical (ISM) frequency band is 902–928 MHz. The ISM frequency band is primarily intended for unlicensed transmitters, which have been certified under Part 15 of the Federal Communications Commission Code (47 C.R.F. §15). Many devices such as cordless phones and wireless LANs share the ISM frequency band and the claimed system is designed to coexist and operate robustly among these other devices. Other frequency ranges can be used without departing from the invention. For example, the reader 12 and the tags 10 can communicate at a low frequency (e.g., about 125–134 KHz).

To minimize signal interference, the frequency of the forward link channel (i.e., reader to tag) is varied among several of the available RF channels in the ISM frequency band in a pseudo-random manner (frequency hopping). Each forward link command is transmitted on a frequency different than the previous command in a pseudo-random manner to avoid continuous interference from other devices operating in this frequency band. Frequency hopping also allows the system to transmit the maximum signal radiation (+36 dBM) under 47 C.R.F. §15.

The active tags 50 provide several features, including: a unique tag identifier for identifying a specific tag and determining the status of the sign associated with the tag (e.g., delivered, displayed); the ability to transmit tag data autonomously to a reader; and the ability to archive tag data taken since the last upload to the reader 12.

As shown in FIG. 5, the tag microprocessor 30 communicates with the RF transmitter 36. The RF transmitter 36 is in communication with tag antenna 18A. The tag 50 is supplied with power by a battery 42.

The active tag 50 has several modes of operation. The typical mode is the deep sleep mode where the tag is generally inactive (no clock is running; however, an RC watchdog timer is running, which uses very little power). The tag 50 spends most of its time in this low-power mode. The tag periodically partially awakens to a lucid sleep mode (when the watchdog timer times out), initiates a low-speed clock, determines if it is time to enter a search mode by examining a search mode counter and, if it is not time, adjusts the search mode counter (e.g., decrements the counter by one), and returns to the deep sleep mode.

Otherwise, if it is time, the tag 50 enters the search mode, which continues to use the low-speed clock. The tag first determines if it is time to check for interrogation signals, referred to as forward link packets (FLPs), from a remote reader 12. If the tag detects what appears to be an interrogation signal, it awakens completely to an interrogation mode. Otherwise, the tag continues in search mode and determines if it is time to perform an autonomous transmission (AT) by examining an AT counter. If it is not time for an AT, the tag adjusts the AT counter by one (e.g., decrements the counter by one) and returns to the deep sleep mode. Otherwise, the tag awakens to interrogation mode, initiates the high-speed clock, and performs an AT (i.e., it transmits the most recently stored sensor data to any reader 12 operating in the surveillance mode).

In the interrogation mode, the tag 50 initiates a high-speed clock, reads at least a portion of the forward link transmission to see if it is a valid interrogation signal intended for this tag 50, and if it is, responds to the interrogation signal. Otherwise, if the transmission is not a valid interrogation signal, the tag waits a programmable period of time for a valid interrogation signal. If no valid interrogation signal is detected within that time, the tag turns OFF the high-speed clock and again enters the deep sleep mode. Otherwise, the tag responds to the valid interrogation signal on a return link channel assigned by the reader 12. Alternatively, the tag 50 transmits its responses to each interrogation signal on each of the return link channels, sequentially.

The various active tag modes include the lucid sleep mode, the search mode, the interrogation mode and the deep sleep mode, and the timing of these modes, according to one embodiment of the invention. The tag 50 spends most of its time in one of the sleep modes. While in the deep sleep mode, the tag 50 uses very little power to help conserve battery life. The tag 50 periodically awakens to the search mode to look for the likely presence of forward link packets (FLPs), and/or to determine if it is time for an autonomous transmission (AT), and then goes back to the deep sleep mode if no likely FLPs are detected and it is not time for an AT.

In the deep sleep mode, the tag's microprocessor 30 is in a static, dormant state with its internal clock oscillator(s) shut down. Only the RC watchdog timer is running. The tag microprocessor 30 can not execute any programs or control any external IO pins in the deep sleep mode. The tag 50 sleeps in this mode most of its life in an effort to conserve battery power. During the deep sleep mode, because the clock oscillator(s) are OFF, a deep sleep counter is adjusted (incremented or decremented) periodically by an internal R/C oscillator. An internal watchdog timer (WDT) monitors the deep sleep counter and when the deep sleep counter, for example, contains a NULL value (all zeros), the WDT wakes up the microprocessor 30 (i.e., the WDT initiates the low-speed clock so that the tag 50 can enter the lucid sleep mode).

In the lucid sleep mode, the tag 50 wakes up enough to determine if it is time to enter the search mode by determining if an internal search mode counter, for example, contains a NULL value (all zeros). Lucid sleep mode requires only a minimal amount of processing and a small amount of power since it is only using the low-speed clock. If it is not time to enter the search mode, the microprocessor 30 adjusts (e.g., decrements) the search mode counter and then reverts back to the deep sleep mode. In summary, during lucid sleep mode, the low-speed clock oscillator is turned ON, thus producing a low-speed clock signal (e.g., 37 KHz), a search mode counter is adjusted, the search mode is entered if the counter contains all zeros, and if not, the low-speed clock oscillator is turned OFF, and deep sleep mode is resumed.

In the search mode, the tag 50 continues to use the low-speed clock (e.g., 37 KHz) to execute instructions that include: determining if it is time to read the sensors, searching for transmissions likely to be forward link packets (FLPs) from a reader 12, and determining if it is time for an autonomous transmission (AT). The microprocessor 30 determines if it is time to read the sensors by examining a sensor counter. If it is time to read the sensors, the microprocessor 30 reads and stores data from each sensor sequentially, as described below. Otherwise, the tag 50 searches for the presence of FLPs by performing pre-discrimination. If pre-discrimination indicates that the transmission is likely a FLP, the tag enters the interrogation mode. Otherwise, the microprocessor 30 determines if it is time to perform an autonomous transmission (AT) by examining an AT counter. If it is not time for an AT, the microprocessor 30 adjusts the counter (e.g., decrements the counter) and returns to the deep sleep mode. Otherwise, the microprocessor 30 awakens to interrogation mode, initiates a high-speed clock, and performs an AT (e.g., it transmits the most recently stored sensor data to a reader 12).

In the interrogation mode, the tag 50 initiates the high-speed clock, reads at least a portion of the forward link packet (FLP), and determines if the FLP is valid. Error detection is accomplished by transmitting error detection bits, such as parity bits, a checksum, or a Cyclical Redundancy Check (CRC), in each FLP. The tag 50 then checks the error detection bits to make sure the transmission is a valid FLP. The tag also checks to insure that the FLP includes data bits and error detection bits (e.g., a CRC), and checks to make sure the total number of bites is indicative of a valid FLP. If the tag 50 detects an error in the FLP (e.g., CRC is not valid), the bad FLP is disregarded and/or the tag 50 requests that the FLP be retransmitted.

In one embodiment, the microprocessor 30 first examines a beginning portion of the FLP and, if that portion indicates that the transmission appears to be a valid FLP, turns on the transmitter 36, and then reads the rest of the FLP to check that the CRC is valid. If the FLP contains a valid CRC, the tag 50 responds to the FLP. Otherwise, if the FLP is determined to be invalid, the microprocessor 30 continues searching for a valid FLP for a predetermined period of time. The period of time the tag 50 continues searching for FLPs is a programmable feature of the tag 50. If no valid interrogation signal is detected within that time, the microprocessor 30 turns OFF the high-speed clock and again enters the deep sleep mode. Otherwise, the tag responds to the valid interrogation signal.

Each tag may include one or more of the following features:

A unique tag identification number—this number specifically identifies a particular tag 10. The tag identification number is typically the tag serial number. This number is programmed into the tag 10 at the factory or during installation (via, for example, a hand-held reader 12H).

A sign or marketing material model number—the sign or marketing material model identifies the type of sign or marketing material, and when and where it should be displayed pursuant to a particular advertising program. This number may also be programmed into the tag 10 at the factory or during installation (via, for example, a hand-held reader 12H).

Tag history data—the tag 50 includes a RAM memory that records history data, such as when and where a sign or marketing material is displayed, when the sign or marketing material is removed, etc. The history tag data is recorded with a time and date stamp that indicates when the data was recorded. This data may be uploaded from the tag 50 to the reader 12, and transferred to the central server 16.

Write-in capability—the tag 50 allows users to write user defined data into the tag memory, including where the sign is being displayed, what type of sign is associated with the tag, etc. This data may be password protected such that only authorized users can write data to the tag 50.

Autonomous transmit (AT)—the tag 50 may be programmed to self-awaken at preset intervals, transmit the tag data to a reader, and go back to sleep without external activation. The tag 50 may be pre-programmed from the factory with a default wake-up interval (e.g., 2.5 seconds); however, the user can change the wake-up interval.

Radio frequency operation—in one embodiment, the claimed system operates at 2.45 GHz, or in the ISM frequency band (902–928 MHz), or at 13.56 MHz, or at a low frequency (e.g., about 125–134 KHz).

Communications—the tag 10 is able to communicate with fixed readers 12F, or hand-held readers 12H.

Data display—tag data is displayed by the hub so retail personnel can monitor the status of each sign and receive messages from the central server 16.

Power—the active tags 50 are powered by a battery 42.

Tag life—given current battery capabilities, total tag life is greater than about 2 years, during normal operating conditions, which is greater than the average life of the sign associated with the tag.

Turn-OFF function—the tag 50 can be activated by a hand-held reader prior to shipment to a retail outlet, which prevents the tag 50 from being ON during storage of the sign. This extends the battery life of the tag 50.

Reader range—for a fixed reader 12F, the reader range is up to and including about 7 feet. This tags associated with signs in adjacent areas within the retail outlet to be differentiated or grouped on the basis of their location. The reader range can be extended to cover between 10–50 meters, effectively covering an entire retail outlet. Hand-held readers 12H can monitor tags up to about 50 meters from the reader antenna 22 (and can operate while the user is in a vehicle moving up to about 73 kilometers per hour).

The reader 12 transmits signals to the tag 50 in the forward link. Readers 12 periodically transmit an RF signal to one or more of the tags 50. Forward link signals are also know as Forward Link Packets (FLPs).

The tag 50 transmits signals to the reader 12 in the return link. A tag 50 generally transmits a response (e.g., tag data) to a reader 12 via the return link in response to a FLP. Return link signals are also know as Return Link Packets (RLPs).

The tag data stored on the central server 16 may be accessed via a local area network (LAN) or the Internet. Tag data may be forwarded to a call center for display on a customer service representative's screen. Using this data, the CSR can call the non-complying retail outlet and try to ascertain the reason for non-compliance with an advertising program and attempt to remedy the situation in a timely manner.

The reader 12, in one embodiment, initiates RF communication with one or more of the tags 10. In one embodiment, the reader 12 is affixed to the signage hardware 48 that is positioned at various locations near the retail outlet (e.g., on a fuel island, on a pump topper, on an external kiosk, on a pump approach, on building signs, on checkout registers, etc.). The reader 12 will communicate with each tag 10 to determine if the corresponding sign is being displayed, and gather data, including when the sign was first displayed, when it is removed, etc. The reader 12 may also obtain the tag history data, which includes all tag data since the last time the tag data was uploaded to the reader. The history data is sent from the reader 12 to the hub 14 and then to the central server 16 by a communication channel 32, comprising one or more of an Ethernet link, Internet link, wire link, wireless link, microwave link, satellite link, optical link, cable link, RF link, LAN link, or other appropriate communication link.

Portable or hand-held readers 12H communicate with the tags 10 and gathers tag data, including history data. Hand-held readers 12H may be used in conjunction with manual inspections, or surveys, to determine if marketing material has been displayed pursuant to a specific program. These readers 12H decrease the time and cost of surveys by reading all the tags at a specific retail outlet, within a small amount of time, without requiring the user to even exit his car. The hand-held readers 12H provide an "on-site read" of all the tags at a specific location or site.

Referring again to FIG. 7, the process of acquiring tag data will be described. In the interrogation mode, a reader 12 can acquire sensor and other data from a specific tag 10 only when that specific tag 10 is being addressed. In one embodiment, the tag 10 can be addressed by: (1) a unique ID (e.g., tag serial number); or (2) a temporary ID assigned by the reader 12 during a tag interrogation. Tag acquisition is described in more detail hereinafter.

Generally, once the tag data has been uploaded to the reader 12, the tag 50 is instructed to go into a sleep mode (e.g., deep sleep mode) for a programmable period of time. Alternatively, the tag 50 may be programmed to return to a sleep mode once the tag is out of range of the reader 12 for a predetermined period of time. Entering the deep sleep mode completes the tag interrogation session. Thereafter, a new interrogation session can begin.

Preferably, the tag 50 is cost effective, uses low power, and complies with FCC Part 15 (47 C.R.F. §15). The maximum allowable power (in free space) without spectrum spreading is −1 dBM. The return link (i.e., tag to reader) has the capability of transmitting on any one of several available radio frequency channels. This provides the active tag 50 with a means for avoiding signals from interfering devices. In one embodiment, the tag 50 responds to FLPs on each of the different return link channels, sequentially. In another embodiment, the reader 12 monitors the return link channels and commands the tag 50 to transmit on the channel having the least amount of interference. For autonomous transmission (AT), the tag 50 has the option of transmitting return link packets (RLPs) on any or all of the return link channels.

In one embodiment, there are four return link channels. These channels are used to transmit data from the tag 50 to the reader 12 and/or from the reader 12 to the hub 14. The return link packets (RLPs) are transmitted on each of the channels, sequentially. For example, if the tag 50 responds to a reader 12 with its serial number on channel 1, the tag 50 will then respond to the next reader command on channel 2. If the reader 12 receives bad data from the tag, it will disregard that data and command the tag 50 to retransmit the data. The tag 50 will then retransmit the data on channel 3. If the reader 12 determines that the received data is again corrupt, it will command the tag 50 to retransmit the data. In one embodiment, retransmission of data will continue until the data has been sent five times (once on each channel, e.g., on channel 1, 2, 3, 4, and 1—the first channel is tried twice). If the reader 12 still does not receive good data, it will cease transmitting to that particular tag 50 for a predetermined period of time.

Alternatively, the reader 12 can monitor the four return link channels, and determine which channel has the lowest received signal strength (RSS), which indicates the channel having the least amount of noise and/or interference. Thus, the channel having the lowest RSS has the least signal interference. Therefore, after the reader 12 determines which channel has the lowest RSS, it sends two bits in a forward link packet (FLP) that correspond to the return link channel having the lowest RSS and instructs the tag 50 to transmit return link packets on that channel. The duration of interfering signals can be expected to be on the order of several seconds. Therefore, the reader 12 checks for clear return link channels every several seconds. The reader 12 tunes itself to receive tag signals on the indicated return link channel and transmits a NULL command (all zeros). The NULL command is broadcast to prevent any other tag from responding while the reader 12 monitors the RSS level. The lowest RSS channel becomes the channel to which a specific tag 50 will be commanded to respond, until another channel has been determined to have the lowest RSS. Again, the lowest RSS channel is selected because that channel is open, and not interfering with other transmissions. Each reader 12 has a received signal strength (RSS) indicator, which tells the reader 12 that a tag 50 is attempting to respond. The reader 12 investigates the received signal strength on its incoming return link channels. The reader 12 then sends a forward link packet instructing the tag 50 to respond on the channel having the lowest RSS and monitors that channel for tag transmissions. Likewise, the hub 14 can monitor the four return link channels, determine which channel has the lowest received signal strength (RSS), and instruct the reader 12 to transmit return link packets on that channel.

During forward link communication, packets are sent from the central sever 16 to the hub 14, from the hub 14 to the reader 12, or from the reader 12 to the tag 50. During return link communication, packets are sent from the tag 50 to the reader 12, from the reader 12 to the hub 14, or from the hub 14 to the central sever 16. The tag data is communicated in this fashion from one device to the next (see FIG. 4). Not all of the devices illustrated are required in the system. For instance, data can be communicated directly from the reader 12 to the central server 16.

Under 47 C.R.F. §15, using spread spectrum transmission (i.e., frequency hopping), the maximum allowable power that can be radiated in free space is +36 dBM (without using spread spectrum transmission, the maximum allowable power in free space is −1 dBM). In the forward link, the amount of power transmitted is measured near the tag. Some attenuation may result from transmission through the sign, and additional attenuation may occur due to interference from other signs, cars and/or structures.

Fifty forward link channels were selected in part due to FCC Part 15 (47 C.R.F. §15), which specifies 50 channels as the minimum; however, it is apparent that more than 50 channels could be used in this spread-spectrum system.

It is possible that two tags 50 will awaken at the same time and both be within range of the reader antenna 22. If this occurs, interference may result since both tags 50 may be responding to the same message on the same return link channel. To identify and communicate with one tag out of many tags that may be within range, the reader 12 uses an algorithm, as described below, and/or transmits to a specific tag 50 by transmitting that tag's unique tag serial number or functional ID number.

The tag 50 includes a microprocessor 30 that controls the operation of the tag 50. In one embodiment, the microprocessor 30 includes two internal oscillators, internal RAM, internal ROM, and other standard features. To maximize battery life, two oscillators are desirable because they allow for two different clock speeds. Having two clocks allows a designer to minimize use of the high-speed clock (thus, conserving battery power). The two oscillators could also be externally supplied to the microprocessor.

The tag microprocessor 30 periodically awakens from the deep sleep mode to the lucid sleep mode. In the lucid sleep mode, the microprocessor initiates the low-speed clock and determines if it is time to enter the search mode by examining a search mode counter. The counter will either indicate that it is time to enter the search mode (e.g., the counter contains all zeros) or it will indicate some other value. If it is not time to enter the search mode, the microprocessor adjusts the search mode counter (e.g., decrements the counter) and returns to the deep sleep mode.

Otherwise, the microprocessor enters the search mode, and continues using the low-speed clock. The microprocessor determines if it is time to perform pre-discrimination, where the microprocessor determines whether a transmission is likely a forward link packet (FLP). If the microprocessor determines that the transmission is likely a FLP, it enters the interrogation mode. Otherwise, the microprocessor determines if it is time to perform an autonomous transmission (AT) by examining an AT counter. If it is not time for an AT, the microprocessor adjusts the AT counter (e.g., decrements the counter) and returns to the deep sleep mode. Otherwise, the microprocessor 30 awakens to the interrogation mode, initiates the high-speed clock, and performs an AT (i.e., it transmits the most recently stored sensor data to a reader 12).

A EEPROM can be used for storing tag history data. History data is periodically written from the microprocessor RAM to the EEPROM. The EEPROM is a non-volatile memory; therefore, it does not need power to maintain its information, and can be turned off to conserve battery power.

In the interrogation mode, the tag 50 can receive and transmit data. Upon entering the interrogation mode, the microprocessor initiates the high-speed clock, examines at least a portion of the FLP and, if that portion indicates that the transmission appears to be a valid FLP, turns ON the tag transmitter, and then reads the rest of the FLP to determine whether the CRC is valid. If the FLP contains a valid CRC, the tag 50 responds to the FLP. In one embodiment, the tag transmitter is designed to transmit on several distinct channels. Only one of the channels is normally used during any individual RLP transmission. Upon completion of the interrogation mode, the microprocessor turns OFF the tag components and resumes the deep sleep mode.

In summary, in the search mode, the tag 50 performs pre-discrimination to determine whether a transmission is likely a FLP from a reader 12. If the microprocessor 30 determines that the transmission is likely a FLP, it enters the interrogation mode. Otherwise, the tag 50 again enters the deep sleep mode for a predetermined period of time. In the interrogation mode, the transmission is verified as a valid FLP and the requested tag data stored in the tag 50 is transmitted to the reader 12.

The return link channel to be used for transmission by the tag 50 may be determined in a number of ways. The tag may select the return link channel sequentially (i.e., use a different return link channel for each RLP). Alternatively, the reader 12 may instruct the tag 50 to use a specific channel. One way to determine the best return link channel to use is to have the reader 12 send a NULL command, which causes the tags 50 not to transmit. This allows the reader 12 to determine the received signal strength (RSS) on each of the four return link channels. Thereafter, the reader 12 instructs the tag 50 to send its response back on the return link channel having the lowest signal strength (i.e., the least amount of noise/interference).

In one embodiment, the tag periodically awakens from the deep sleep mode to the lucid sleep mode to determine if it is time to enter the search mode by sampling a search mode counter for a NULL value (all zeros). If the counter contains all zeros, the tag 50 enters the search mode. In the search mode, the tag 50 tests for the likely presence of a forward link packet. If a transmission is likely a FLP, the tag 50 enters the interrogation mode where it verifies that the FLP is valid, and if so, responds thereto. The process of reading valid FLPs continues until the interrogation is complete. The tag 50 then returns to the deep sleep mode.

When no tags 50 are within range of the reader 12, there obviously will be no response to a reader interrogation. When a tag 50 comes into view of the reader 12, however, one way to detect and identify a specific tag 50 is by using an appropriate algorithm to identify one tag out of many. Such algorithms are known in the art. The algorithm may identify a tag by an identification number (such as the tag serial number). Another way to identify a specific tag 50 is by using a temporary ID number (valid for only one interrogation session). Identification by temporary ID may be used in instances where fast acquisition of tag data is required.

In one embodiment, a tag 50 can be identified by its factory encoded serial number (which is unique to each tag), or a temporary ID number (which is a short number that identifies the tag only during a particular interrogation session). In another embodiment, the reader 12 sends an interrogation signal and monitors the received signal strength (RSS) level on the return link channels to determine if any tags 50 are within range. If the level of the RSS indicates that one (and only one) tag is within range of the reader, an interrogation signal is sent requesting tag data.

Referring to FIG. 7, the hub 14 receives data from the readers 12H and 12F and issues commands to the readers. This data is transmitted over a communication channel 20, such as a wireless link. This data is transmitted to the central server 16 over another communication channel 32, such as a telephone line. In one embodiment, a temporary ID is assigned to a particular tag 50 so that a reader 12 can discriminate signals from that tag 50 from signals from other tags. Once the temporary ID has been assigned, the tag 50 will respond only to commands that specifically identify that specific temporary ID. The tag 50 will remain acquired while in range of FLPs from the reader 12. Once the tag 50 is out of range, it will go to sleep after a predetermined period of time. Alternatively, the reader 12 will typically command the tag 50 to enter the deep sleep mode once the interrogation mode is complete.

Once a tag 50 has been specifically identified (acquired), the reader 12 interrogates the tag 50 by sending command signals that request tag data. Tag data may include the tag identification number, sign status (delivered, displayed), and time and date information. This data is received by reader 12, transferred to the hub 14 and periodically sent to the central server 16.

In one embodiment, the tag 50 and the reader 12 perform their receive/transmit functions according to a specific command/response protocol. Once the reader 12 has successfully obtained all the requested tag data, it generally issues a command signal placing the tag 50 into the deep sleep mode. In one embodiment, the deep sleep mode is designed to last long enough to ensure that the tag does not reawaken while other tags are being interrogated. Even if the tag were to reawaken, an erroneous double read of the same tag can be avoided by correlating the tag data from a specific tag with that tag's serial number. Generally, once the initial tag 50 is placed into the deep sleep mode, the system will then read the next tag 50, which may be on an adjacent sign.

The tag 50 is in the deep sleep mode for a predetermined period of time. The tag 50 then wakens to the lucid sleep mode for a few milliseconds to determine if it is time to enter the search mode (by examining a counter) and, if it is not time, the tag 50 resumes the deep sleep mode. At some point, the tag 50 enters the search mode (using a low-speed clock). If a transmission is received that is likely a FLP, the tag enters the interrogation mode (using a high-speed clock) where the FLP is read and validated. However, if a transmission is not likely a FLP, the tag 50 remains in the search mode and determines if it is time to perform an autonomous transmission (AT) and, if not, transitions back to the deep sleep mode for a programmable period of time.

The tag data from a tag 10 can be accessed via the central server 16, which typically includes a keyboard for data input by a user and a display for data output to a user. The display provides tag data to a user. This data is archived in the central server 16. The central server 16 also provides a LAN or Web interface to the system for providing the tag data to a remote user (such as a CSR) and for allowing the remote user to analyze the tag data, or enter user defined data, such as the retail outlet where the sign is being displayed, the compliance history of the retail outlet, etc.

Although the embodiment illustrated in FIG. 7 shows the central server 16 in communication with the hub 14, these components may be a single unit or, alternatively, separated by a large distance. The arrangement of components is driven by the implementation in which these components will be used rather than by any requirements of the system.

In addition, the reader 12, the hub 14, and the central server 16 may be two or more separate units, and data may be transmitted between these units using a request/response protocol (where, for example, the central server requests data from the hub) or using a push protocol (where, for example, the hub periodically transmits data to the central server 16 without such data being requested by the central server 16).

In the normal mode of operation, the system uses a wireless protocol having a command/response architecture. The reader 12 transmits Forward Link Packets (FLPs) at periodic intervals and listens for Return Link Packets (RLPs) from a tag 50 at specified times between the FLPs. The tag 50 wakes up periodically and remains on long enough so that it does not miss a FLP from the reader 12.

The deep sleep mode uses a watchdog timer (WDT) to determine when to wake up. During the deep sleep mode, the microprocessor is not running and all clocks are stopped. Thus, only a minimum amount of power is consumed in the deep sleep mode. When the WDT times out, the microprocessor is started in its low-speed clock mode (referred to as lucid sleep mode), where the tag determines if it is time to enter the search mode. The lucid sleep mode and search mode can be combined into a single mode.

In the search mode, the tag 50 uses a low-speed clock and searches for transmissions likely to be FLPs. Upon detection of a transmission indicative of a FLP, the tag enters the interrogation mode, initiates a high-speed clock, verifies the presence of a valid FLP, and responds thereto. The sleep modes used in the communication protocol conserve battery power because the tag 50 is only turned ON in response to a valid FLP.

A novel advertising compliance system has been disclosed that includes a tag 10 that is affixed to a sign 46. The active tag 50 includes a microprocessor 30 for storing tag data and communicating with the reader 12. The tag 50 periodically awakens to search for likely FLPs. If one is detected, the tag further awakens, verifies that the transmission is a valid FLP, and if so, responds to the FLP command. When the tag 50 receives a valid command from a reader 12, it sends responsive data via one or more RLPs. Typically, the reader 12 first interrogates the tag 50 for its serial number (or assigns a temporary ID). The reader 12 then requests the tag data stored in the tag memory. The tag 50 then transmits responsive RLPs to the reader 12. Upon completion of the interrogation mode, the tag 50 resumes the deep sleep mode.

In one embodiment, the system includes an RFID tag that transmits parameters regarding intended location, content, sponsor, purpose, etc. The RFID signal to the reader contains some or all of the following information:

Unique 32-bit tag identifier (may be written to tag at time of marketing material production or shipping, or pre-programmed by tag manufacturer)
    Product number using "Stub" format:
        POP sponsor (4 characters)
        Promotion number (5 characters)
        Start date (3 characters)
        Category (3 characters)
        Subcategory (2 characters)
        Sign type (3 characters)
        Sign placement (3 characters)
        Expiration date (3 characters)
        Price point (4 characters)
        "Per"/disclaimer conditions (3 characters)
    Date produced (3 characters)
    Sign producer ID (3 characters)
    Retail outlet ID (5 characters)

In one embodiment, the system includes an outdoor reader that receives tag data and transmits tag data, reader ID & battery status information. Such a reader may be mounted in a tamper-proof package that is securely mountable to sign hardware (e.g., plastic, painted/plated steel, or bare/anodized aluminum). The reader is removable by authorized personnel for remote repair. In another embodiment, the reader is mounted in a tamper-proof package that is securely mountable to glass or painted/plated/anodized metal.

In one embodiment, when the reader is polled by the hub, the reader reads and transmits information from the RFID tag.

In one embodiment, the RDIF data may include some or all of the following information:
    Transponder ID (6 characters, alpha-numeric)
    Battery status (1 character, alpha-numeric)
    Trouble-light status (1 character, alpha-numeric)
    RFID asset tag information (110 characters, alpha-numeric)

In one embodiment, the system includes an indoor reader that receives tag data and transmits tag data, reader ID and battery status information. Such a reader may be mounted in a tamper-proof package that is securely mountable to sign hardware (e.g., plastic, painted/plated steel, or bare/anodized aluminum). The reader is removable by authorized personnel for remote repair. In another embodiment, the reader is mounted in a tamper-proof package that is securely mountable to glass or painted/plated/anodized metal.

In one embodiment, the system includes a hub that polls readers, displays problem conditions/solutions, polls local phone line, logs into central server, reports signage information and trouble conditions. Such a hub may be movable, with rubber "feet" for stability.

In one embodiment, the hub may include some or all of the following features:
    Auto boot program in power-up/restarts
    Remote versioning/upgrades & POP administration
    Non-volatile RAM for program & data storage
    "Register" the number of transceivers and ID/frequencies/location of each
    Seek and register interference-free frequency for each transponder
    Turn on a trouble light for a specific reader when signal is weak, repeated interference occurs on all channels, no signal, or the wrong sign is placed in sign hardware
    Ignore certain/all readers when instructed by host
    Keep track of time
    "Poll" each reader, and store its asset information periodically (e.g., every 4 hours)
    Compare current vs. prior asset register
    Store 2 toll-free phone numbers
    Test status of phone line, dial number, if unsuccessful dial alternate number
    Perform modem "handshake" with central server
    Hub data to central server may include some or all of the following:
        Time stamp
        Hub ID
        Changes or additions to transceiver locations
        Number of transceiver signals expected
        Number of transceivers reporting
        "Checksum" stamp from last hub/server connection
        Current RFID asset information for each transceiver
        Trouble-light status for each transceiver
        POP program information for next 24 hours
        Hub program updates
        New "checksum" stamp from hub/server connection In one embodiment, the system includes a central server that coordinates hub polling, consolidates POP program information, collects and reports signage configuration for each retail site. The central server, in one embodiment, administers POP programs for all registered signage and provide status reports for all sites and programs, with feeds to call center customer service representatives.

In one embodiment, the system includes an RFID writer that writes data to RFID tags to be affixed to signage during the packing/shipping process. The RFID writer may comprise a hand-held reader 12. The data written to the tags may include parameters for a specific POP program (from the central server) and/or the locations participating in the program. The RFID writer may also register assets to the central server and/or an invoicing/billing system.

While particular embodiments of the invention have been shown and described in detail, it will be obvious to those skilled in the art that changes and modifications of the present invention, in its various embodiments, may be made without departing from the spirit and scope of the invention. Other elements, steps, methods and techniques that are insubstantially different from those described herein are also within the scope of the invention. Thus, the scope of the invention should not be limited by the particular embodiments described herein but should be defined by the appended claims and equivalents thereof.

The invention claimed is:

1. A method for remotely monitoring compliance with an advertising program without human intervention by determining the presence of a plurality of promotional signs each at a predetermined location at a plurality of facilities, comprising:
    associating RF means with a plurality of promotional signs each to be displayed for advertising purposes for wirelessly sending data about the signs from the signs;
    locating RF receiving means remotely from the signs for receiving the sign data; and analyzing the sign data to determine the identity of the signs and whether the signs are timely and properly located at the various facilities and thereby in compliance with the advertising program.

2. The system for remotely monitoring compliance with an advertising program without human intervention by determining the presence of a plurality of signs at a predetermined location at a plurality of facilities, as set forth in claim 1, and further comprising:
- associating an RF contact tag with a sign to be displayed for advertising purposes for wirelessly sending data related to the sign;
- locating RF receiving means at each facility for receiving the sign data;
- providing a computer for directly or indirectly receiving the sign data and for analyzing the sign data to determine the identity of the signs and whether the signs are timely and properly located at the various facilities and thereby in compliance with the advertising program.

3. A system for remotely monitoring compliance with an advertising program without human intervention by determining the presence of a plurality of promotional signs each at a predetermined location at a plurality of facilities, comprising:
- RF means associated with each sign to be displayed for advertising purposes for only wirelessly sending data related to the sign;
- RF receiving means remotely located from the signs for receiving the sign data; and
- means for directly or indirectly receiving the sign data and analyzing the sign data to determine the identity of the signs and whether the signs are timely and properly located at the various facilities and thereby in compliance with the advertising program, and by inference determining which signs are not timely and/or properly located and therefore require remediation to be in compliance with the program.

4. A method for remotely monitoring compliance with an advertising program without human intervention by determining the presence of a plurality of promotional signs at predetermined locations at a plurality of facilities, comprising:
- associating RF means with each sign to be displayed for advertising purposes for wirelessly sending data about the sign from the sign;
- locating receiving means remotely from the signs for receiving the sign data and wherein the sign data includes an identifier;
- providing analyzing means for directly or indirectly receiving the sign data and for analyzing the sign data to determine the identity of the signs and whether the signs are timely and properly located at the various facilities and thereby in compliance with the advertising program.

5. A system for remotely monitoring compliance with an advertising program without human intervention by determining the presence of a plurality of signs at a predetermined location at a plurality of facilities, comprising:
- RF means associated with a promotional sign to be displayed for advertising purposes for wirelessly sending data related to the sign;
- receiving means remotely located from the signs for receiving the sign data and wherein the sign data includes a sign identifier;
- analyzing means for directly or indirectly receiving the sign data and for analyzing the sign data to determine the identity of the signs and whether the signs are timely and properly located at the various facilities and thereby in compliance with the advertising programs, and by inference determining which signs are not timely and/or properly located and therefore require remediation to be in compliance with the program.

6. An RF system for remotely monitoring, without human intervention, compliance with an advertising program comprising signs to be located at a plurality of different facilities by determining the presence of one or more advertising signs at a plurality of predetermined locations, with at least one sign at each facility in the program, comprising:
- a tag associated with each advertising sign, the sign being displayed for advertising purposes, and the tag being adapted for RF communication;
- at least one RF reader at each facility for receiving tag data from each tag within range of the reader where the received tag data indicates the identity of and presence of the tag and its corresponding sign in a particular one of the predetermined locations at a facility in the program; and
- hub means for directly or indirectly receiving tag data from each tag at the facility and for transmitting the tag data to a remotely located computer that receives and analyzes the tag data from the plurality of different facilities to determine the identity of each sign and whether each sign is timely and properly located in each facility and thereby which advertising signs and facilities are in compliance with the advertising program, and by inference determining which signs are not timely and/or properly located and therefore require remediation to be in compliance with the program.

7. The system of claim 6, wherein the sign is selected from the group consisting of marketing materials, displays, coupon dispensers, signage, display racks, floor mats, counter mats, containers, promotional hardware, seasonal promotions, and products.

8. The system of claim 6, wherein the tag is a passive tag.

9. The system of claim 6, wherein the tag is an RF contact tag that directly receives an identifier from said signs and said contact tag transmits the identifier and tag identifier to determines the specific location of the sign.

10. The system of claim 9, wherein the contact tag and the sign include sign identification indicia and tag identification indicia which are RF transmitted.

11. The system of claim 6, wherein the tag autonomously transmits tag data on a periodic basis.

12. The system of claim 6, wherein each reader and/or hub includes a data management module capable of reading tag data from different types of tags.

13. The system of claim 6, wherein the tag is a passive tag that receives energy from a noncontact close proximity external source.

14. An RF system for remotely monitoring, without human intervention, compliance with an advertising program comprising signs to be located at a plurality of different facilities by determining the presence of one or more advertising signs at a plurality of predetermined locations, with at least one sign at each facility in the program, comprising:
- a tag associated with each advertising sign, the sign being displayed for advertising purposes, and the tag being adapted for RF communication;
- at least one RF reader at each facility for receiving tag data from each tag within range of the reader where the received tag data indicates the identity of and presence of the tag and its corresponding sign in a particular one of the predetermined locations at a facility in the program; and means for directly or indirectly receiving tag data from each tag at the facility and for transmitting the tag data to a remotely located computer that receives and analyzes the tag data from the plurality of different facilities to determine the identity of each sign and whether each sign is timely and properly located in each facility and thereby which advertising signs and facilities are in compliance with the advertising program, and by inference determining which signs are not timely and/or properly located and therefore require remediation to be in compliance, and wherein said tag is intended to be inconspicuously associated with said sign and provides no indicia of the advertising message.

15. A method of remotely monitoring, without human intervention, compliance with an advertising program by determining the presence of a plurality of advertising signs at predetermined locations at a number of separate facilities where the signs are to be placed, comprising:

associating an RF capable tag with each sign, the tag storing a tag identifier; using an RF reader at each facility to receive tag data from each tag within range of the reader;

determining from the received tag data the identity of and presence of the tag and its corresponding advertising sign associated with the tag in a particular location at one of the facilities in the program;

locating a hub for directly or indirectly receiving tag data from the tag; and receiving and analyzing the tag data from each hub at a location remote from at least one facility to determine the identity of each sign and whether each sign is timely and properly located and the facility where the tag is located and thereby whether each sign and each facility are in compliance with the advertising program, and by inference determining which signs are not timely and/or properly located and therefore require remediation to be in compliance with the program.

16. The method of claim 15, further comprising detecting whether the sign is moved from the specified location.

17. The method of claim 15, further wherein said tag data at the remote location indicates the tag is moved from a predetermined location, to enable remediation if so desired.

18. A method for automatically monitoring compliance with an advertising program using advertising signs by determining the presence of at least one style of advertising sign to be located within a plurality of facilities, comprising:

providing a plurality of advertising sign bearing advertising indicia, each said sign being arranged to be located within each of the facilities for display within the respective facility;

coupling an RF tag to said each sign for wirelessly sending tag data associated with said sign;

providing a receiver located remotely from said each sign for receiving said tag data from said RF tag; and coupling a computer means to said receiver for analyzing said tag data to determine if each said sign is located within the respective facility and providing information indicative of that determination.

19. The method of claim 18, wherein said tag data at the remote location indicates whether the sign is moved from the specified location, to enable remediation if so desired.

20. A system for automatically monitoring compliance with an advertising program using advertising signs by determining the presence of at least one advertising sign to be located within a plurality of facilities, comprising:

a plurality of advertising signs bearing advertising indicia, each said sign being arranged to be located within each of the facilities for display within the respective facility;

an RF tag coupled to each said sign for wirelessly sending tag data associated with said sign;

a receiver located remotely from said sign for receiving said tag data from said RF tag; and computer means coupled to said receiver for analyzing said tag data to determine if each said sign is located within the respective facility and for providing information indicative of that determination.

21. The system of claim 20, wherein the sign is selected from the group consisting of marketing materials, displays, coupon dispensers, signage, display racks, floor mats, counter mats, containers, promotional hardware, seasonal promotions, and products.

22. The system of claim 20, wherein the tag is a passive tag.

23. The system of claim 20, wherein the tag is an RF contact tag that directly releases an identifier from the sign and said contact tag transmits the sign information and tag identifier to determines the specific location of the sign.

24. The system of claim 20 , wherein the tag autonomously transmits tag data on a periodic basis.

25. The system of claim 20, wherein the tag is a passive tag that receives energy from a noncontact close proximity external source.

26. A system for automatically monitoring compliance with an advertising program using advertising signs by determining the presence of at least one advertising sign to be located within a plurality of facilities, comprising:

a plurality of advertising signs bearing advertising indicia, each said sign being arranged to be located within each of the facilities for display within the respective facility;

an RF tag coupled to said sign for wirelessly sending tag data associated with said sign;

a receiver located remotely from said sign for receiving said tag data from said RF tag; and computer means coupled to said receiver for analyzing said tag data to determine if each said sign is located within the respective facility and for providing information indicative of that determination, and wherein said each tag is intended to be inconspicuously associated with said sign and provides no indicia of the advertising message.

* * * * *